UNITED STATES PATENT OFFICE.

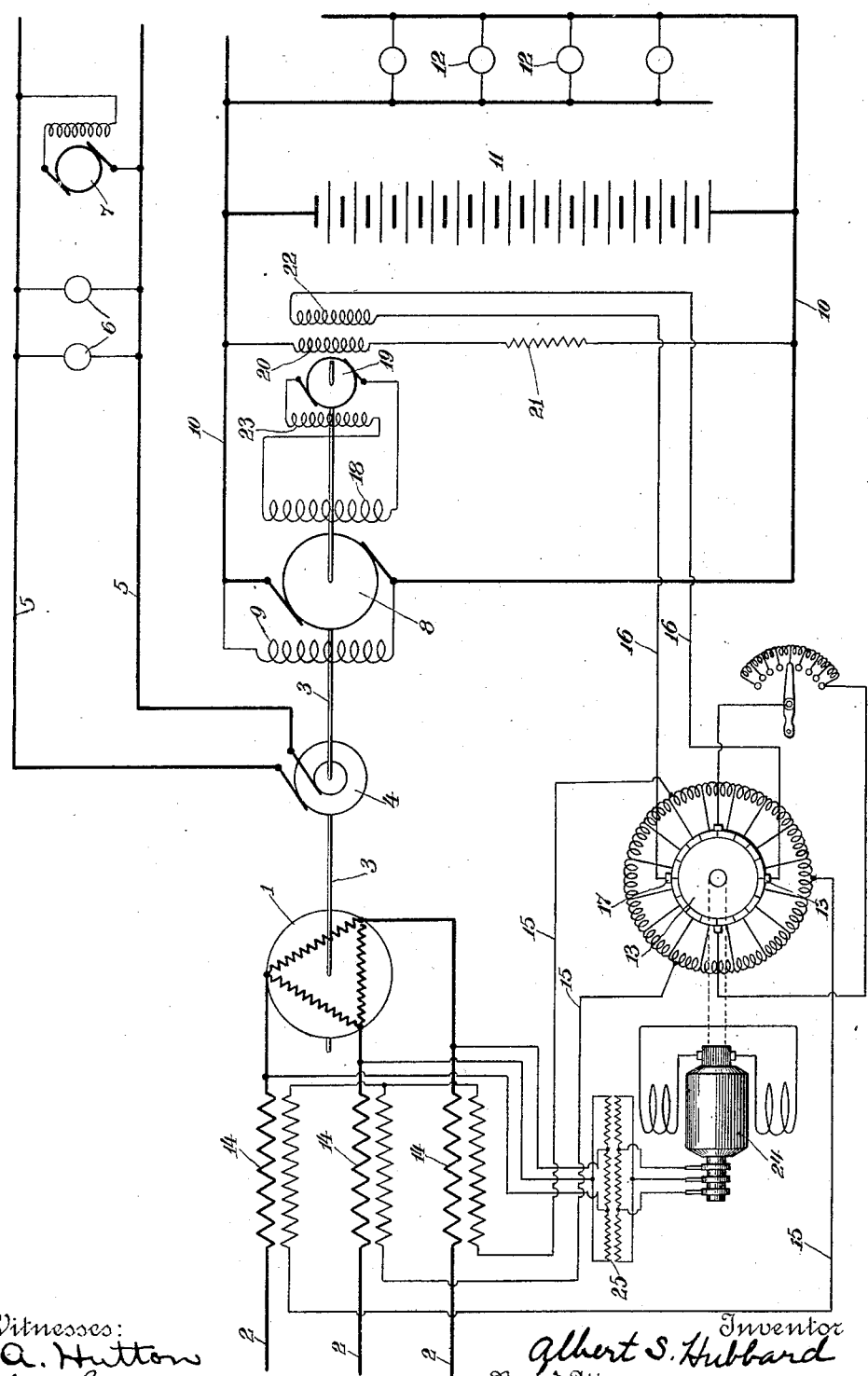

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

1,003,746.  Specification of Letters Patent.  Patented Sept. 19, 1911.

Application filed January 28, 1909. Serial No. 474,871.

*To all whom it may concern:*

Be it known that I, ALBERT S. HUBBARD, a citizen of the United States, and a resident of Belleville, Essex county, State of New Jersey, have invented certain new and useful Improvements in Electrical Systems of Distribution, of which the following is a specification.

My invention relates to electrical systems of distribution in general but I have more especially devised it with relation to systems in which an alternating current source of electrical energy supplies one or more translating devices or electrical feeding circuits.

Especially in systems in which the alternating current source furnishes energy to drive a dynamo-electric apparatus which in turn furnishes mechanical energy for a plurality of loads and in which the total load is subject to fluctuations it is often very advantageous to regulate for such variations in order to maintain a substantially constant load on the source. In order to do this I propose to operatively connect with the source a direct current generating apparatus connected with a direct current circuit across which is connected a battery to be charged therefrom. I provide automatic means subject to fluctuations of load on the alternating current source or line for regulating the voltage of the direct current circuit in such a manner that when an excess of load is placed upon the source of the system the direct current circuit will furnish energy to tend to maintain a constant load on the alternating current source. When the load on the alternating current source is below normal energy is furnished to the direct current circuit thereby, and the battery is charged therefrom.

One object of my invention is to provide an exceptionally economical and efficient regulating arrangement without the use of a booster in the battery circuit. I further provide means for obtaining an exceptionally quick regulation, and, by eliminating the booster in the battery circuit the energy used up therein is saved.

Further objects, features and advantages will be more clearly apparent from the detailed description given below taken in connection with the accompanying drawing which diagrammatically shows a system embodying one form of my invention.

In the drawing, 1 represents an induction motor driven from a high potential alternating current circuit 2, 2, 2. The motor 1 is mechanically connected by means of a shaft 3 to drive a single phase alternator 4 which supplies the single phase alternating current circuit 5, 5, and feeds translating devices such as lamps 6 and induction motor 7. Also connected to be driven by the induction motor 1 through shaft 3 is a direct current generator 8 having a shunt field 9. The generator 8 is connected to the direct current circuit 10, 10, across which is connected the battery 11. If desired the direct current circuit may also feed translating devices such as lamps 12.

13 represents a rectifier of the induction type which is supplied from the secondaries of series transformers 14, 14, 14, in the alternating current circuit 2, 2, 2. This type of rectifier is not new with this application but is very fully described in my Patent No. 869,244, granted October 29th, 1907; and it will be sufficient to here state that the variations and fluctuations of the alternating current circuit 2, 2, 2, are transmitted to the alternating current windings of the rectifier 13 by means of conductors 15 and these fluctuations and variations are produced and felt in the direct current circuit 16, 16, connected to two of the brushes 17, 17, of the rectifier 13. The rectifier 13 is driven by a synchronous motor 24 connected to be fed from the alternating current circuit 2, 2, 2, through a transformer 25.

As will readily appear, since the rectifier 13 is driven in synchronism and suitable means is provided for side tracking that portion of the rectifier current corresponding to the wattless energy, the rectifier 13 is responsive to power factor changes of the circuit 2, 2, 2, and delivers a current to the circuit 16, 16, responsive to variations of true energy supplied to the motor 1.

The direct current generator 8 is provided with an auxiliary field winding 18 connected to oppose or aid the field winding 9 as the regulation requires. The excitation of winding 18 is produced by an exciter 19 having a field coil 20 connected across the direct current circuit to provide a substantially constant magneto-motive force.

21 represents a high temperature coefficient resistance in series with the field winding 20 to prevent undue fluctuations of current therein upon variations of voltage on the direct current circuit 10, 10.

22 is a second field winding on the exciter 19 connected to oppose the field winding 20. This winding 22 is connected in series in the circuit 16, 16, and is thereby made responsive to the fluctuations and variations on the alternating current circuit 2, 2, 2.

The induction motor 1 combined with the direct current generator 8 may be considered as a converting apparatus for transferring of energy between the high tension alternating current feeding circuit 2, 2, 2, and the direct current circuit 10, 10, for charging the battery or feeding the translating devices 12, or as a dynamo-electric converting apparatus for transferring of energy from the battery 11 and direct current circuit 10 to the induction motor 1 or the machines driven thereby.

In operation when the system is working under normal conditions with a normal load thereupon the strength of field coil 22 is just sufficient to oppose and off-set the strength of field coil 20 so that the exciter 19 is deprived of excitation. It will, therefore, produce no armature current and no current flow in the field coil 18 in series with the armature of the exciter 19. Upon an increase of load upon the alternating current circuit 2, 2, 2, or the induction motor 1 the current in field coil 22 is increased, thereby exciting the machine 19 in such a direction that it will furnish current to the field coil 18 of the direct current generator 8 in such a direction as to oppose the field coil 9 and cut down the excitation of the machine so that its voltage will be materially decreased. Thus if the load increases above a predetermined value the voltage of the generator 8 will be dropped below that of the battery whereupon the battery will furnish current to the machine 8 which will now act as a motor to help the induction motor 1 drive the single phase machine 4 or any other units or devices which may be mechanically connected to the shaft 3.

Under normal conditions when the strength of the field coils 20 and 22 are equal and no excitation of the dynamo 19 is had the generator 8 produces a voltage sufficient to cause the battery 11 to float across the direct current circuit 10, 10. When the load on the system decreases below normal the field coil 22 is weakened responsively thereto, whereupon the dynamo 19 is excited in the opposite direction so that current is supplied the coil 18 in the opposite direction to increase the excitation of the direct current machine 8, thereby increasing its voltage so that energy will be transferred from the high tension circuit to the direct current circuit 10, 10, to charge the battery 11.

In order to obtain especially quick action in the regulating apparatus I design the exciter 19 so that if not otherwise effected the field coils 20 or 22 would produce an excitation therefor more than sufficient to produce the required change in field coil 18. That is, the exciter 19 is designed to produce an abnormally high voltage on the field coil 18 whenever fluctuations occur on the high tension circuit. It is well known that the greater the voltage applied to a field the quicker it will build up and by thus designing the machine 19 I get a quicker building up of the field 18, and, therefore, quicker regulation. In order, however, that this quick building up may not be followed by too great an effect upon the direct current machine 8 I provide an opposing field 23 in series with the armature of the machine 19 and coil 18. As the armature current of the machine 19 tends to increase, its excitation is decreased by this opposing coil 23 whereby the current in coil 18 is prevented from becoming too large, but at the same time allowing the quick action to be had by the application of the high voltage thereto.

From the above it will be apparent that I have described an especially economical and efficient means for maintaining the load on the high tension circuit or induction motor 1 substantially constant by simply operating upon the direct current machine 8 to vary or decrease its voltage. I avoid the use of a booster in the battery circuit and accordingly eliminate the use of energy necessary to the operation of the booster.

Although I have described my improvements in great detail and with reference to a specific system I do not desire to be limited by such details but Having fully and clearly described my invention what I claim as new and desire to secure by Letters Patent is:

1. In an electric system of distribution, an alternating current circuit, an induction motor driven therefrom, a direct current generator mechanically driven by the motor, a battery and direct current load arranged to be fed by the generator and means for varying the voltage of said generator to vary the division of load between it and the battery responsive to load fluctuations on the motor.

2. In an electric system of distribution, an alternating current circuit, an induction motor driven therefrom, a direct current generator mechanically driven by the motor, a battery and direct current load arranged to be fed by the generator, an exciter for varying the voltage of the generator to vary the division of load between it and the battery, and means for controlling said exciter responsive to load changes on the motor.

3. In an electrical system of distribution, a high tension feeding circuit, a motor receiving its energy therefrom, a plurality of electric generating units driven from the motor, one of said units being a direct current generator with a battery and direct current load connected thereto, and means for varying the voltage of said direct current generator to vary the division of load between it and the battery responsive to fluctuations in the load on said motor.

4. In an electrical system of distribution, a high tension alternating current feeding circuit, a motor receiving its energy therefrom, a plurality of electric generating units driven from the motor, one of said units being a direct current generator with a battery and direct current load connected thereto, an exciting dynamo for controlling the voltage of said direct current generator to control the division of load between it and the battery and apparatus operated responsively to load fluctuations on the high tension circuit for controlling the operation of said exciting dynamo.

5. In an electrical system of distribution, an alternating current circuit, a motor receiving its energy therefrom, a plurality of electric generating units mechanically driven from the motor, one of said units being a direct current generator with a battery and direct current load fed thereby, and apparatus for varying the voltage of said direct current generator to vary the division of load between it and the battery responsive to load fluctuations on the alternating current circuit.

6. In an electrical system of distribution, a high tension alternating current circuit, an induction motor receiving its energy therefrom, an alternating current generator and a direct current generator mechanically driven from said motor, a battery and direct current circuit connected to the direct current generator, an exciter for the direct current generator for varying its voltage, and apparatus for controlling the operation of the exciter responsive to load variations on said motor to control the division of load between the motor and the battery.

7. In an electrical system of distribution, a high tension alternating current circuit, an induction motor receiving its energy therefrom, an alternating current generator and a direct current generator mechanically driven from said motor, a battery and direct current circuit connected to the direct current generator, an exciter for the direct current generator for varying its voltage, and apparatus for controlling the operation of the exciter responsive to load variations on said motor to control the division of load between the motor and the battery, said apparatus including an alternating-direct current converting apparatus driven by a synchronous motor supplied from the alternating current circuit.

8. In an electrical system of distribution, a feeding circuit, a battery and its direct current circuit, dynamo-electric converting apparatus for transferring energy between said circuits, an exciter for said apparatus arranged to vary the field strength thereof responsive to load fluctuations on said feeding circuit, and means for varying the effect of said exciter responsively to fluctuations in the current output of the exciter.

9. In an electrical system of distribution, an alternating current circuit, a battery and its direct current circuit, dynamo-electric converting apparatus for transferring energy between said circuits, an exciter for varying the field strength of said apparatus to vary the voltage of its direct current end responsive to load fluctuations on the alternating current circuit, and means for cutting down the effect of said exciter responsive to fluctuations in its armature current.

10. In an electrical system of distribution, a high tension feeding circuit, a direct current circuit, a storage apparatus connected to the direct current circuit, dynamo-electric converting apparatus for transferring energy between said circuits, and exciter and coöperating devices for said apparatus for varying the voltage of the direct current end thereof responsive to load variations on said feeding circuit and an auxiliary field coil on the same for cutting down its excitation as its armature current increases.

11. In combination, a source of power, direct current generating apparatus driven therefrom, a battery and its circuit connected to said apparatus, means for varying excitation of said apparatus responsive to load changes on said source and a coil arranged to oppose such variations in the excitation of said apparatus as such variations tend to increase.

12. In combination, a source of power, direct current generating apparatus driven therefrom, a battery and direct current load connected to said apparatus, an exciter for varying the excitation of said apparatus to vary the voltage thereof, whereby the division of load between it and the battery is controlled, means for controlling said exciter responsive to load variations on said source and a coil on said exciter opposing its controlling excitation and connected to be responsive to variations in its armature current.

13. In an electrical system of distribution, an electric feeding circuit, a motor receiving its energy therefrom, a plurality of electric generating units driven thereby, one of said units generating a direct current, a battery and its circuit connected to said last mentioned unit, an exciter for said last mentioned direct current unit, means for controlling the exciter responsive to load changes on said feeding circuit, and a field coil on the exciter opposing its controlling exciting windings, said coil being connected in series with its armature.

14. In a system of electrical distribution, electric generating apparatus, a motor for driving the same supplied by a feeding circuit, a second motor for driving the said apparatus, said second motor being supplied by a storage apparatus and means for varying the voltage of said motor responsive to load fluctuations on said feeding circuit for controlling the division of load between it and the battery, said means including an exciter having a field coil for cutting down its excitation as its armature current increases.

15. In a system of electrical distribution, a high tension circuit, an induction motor receiving its energy therefrom, a direct current generator driven by the induction motor, a battery and its direct current circuit connected to be supplied by the direct current generator, a dynamo-electric machine driven by said motor, an apparatus for varying the field strength of the direct current generator to vary the load on the battery, said apparatus being responsive to power factor changes on the high tension circuit and arranged to regulate responsive to true energy changes in said circuit.

In testimony whereof, I have signed my name to this specification, in the presence of two subscribing witnesses.

ALBERT S. HUBBARD.

Witnesses:
EDWIN SEGER,
GORHAM CROSBY.

---

Copies of this patent may be obtained for five cents each, by addressing the "Commissioner of Patents, Washington, D. C."